(12) United States Patent
Clairet et al.

(10) Patent No.: US 6,577,984 B1
(45) Date of Patent: Jun. 10, 2003

(54) DEVICE AND METHOD FOR DIGITAL POSITION MEASURING

(75) Inventors: Patrick L. Clairet, Chicago, IL (US); Jean-Paul Corbier, Beausoleil (FR); Christine Couronne, Nice (FR); Philippe Zeraffa, Cagnes-sur-Mer (FR)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/331,216

(22) PCT Filed: Dec. 22, 1997

(86) PCT No.: PCT/FR97/02387

§ 371 (c)(1),
(2), (4) Date: Jun. 7, 2000

(87) PCT Pub. No.: WO98/28597

PCT Pub. Date: Jul. 2, 1998

(30) Foreign Application Priority Data

Dec. 20, 1996 (FR) .............................................. 96 16014

(51) Int. Cl.[7] .......................... G06F 15/00; G01C 19/00
(52) U.S. Cl. ......................... 702/151; 33/1 PT; 33/706
(58) Field of Search ................... 702/33, 94, 150–154; 33/1 PT, 706–708, 762, 763; 341/1, 3, 6, 11

(56) References Cited

U.S. PATENT DOCUMENTS

| | | | | |
|---|---|---|---|---|
| 3,705,400 A | * | 12/1972 | Cordes, Jr. ................. 318/632 |
| 4,009,377 A | * | 2/1977 | Elms ........................... 318/603 |
| 4,701,615 A | * | 10/1987 | Schmitt ................... 250/237 G |
| 4,716,534 A | * | 12/1987 | Baucom et al. ........... 250/208.6 |
| 4,736,187 A | * | 4/1988 | Kibrick et al. ......... 250/231.14 |
| 4,793,067 A | * | 12/1988 | Reimar et al. ........... 250/237 G |
| 4,794,536 A | * | 12/1988 | Eto et al. ....................... 116/31 |
| 5,203,420 A | * | 4/1993 | Shiraishi ..................... 180/400 |
| 5,565,864 A | * | 10/1996 | Ohno et al. ..................... 341/1 |
| 5,739,775 A | * | 4/1998 | Brandestini .................. 341/10 |
| 6,158,132 A | * | 12/2000 | Kofink et al. ............... 33/1 PT |
| 6,330,522 B1 | * | 12/2001 | Takeuchi .................... 180/400 |

* cited by examiner

Primary Examiner—Marc S. Hoff
Assistant Examiner—Manuel L. Barbee
(74) Attorney, Agent, or Firm—Thomas N. Twomey

(57) ABSTRACT

The invention concerns a method for indirect and sequential measuring of the absolute position of an element (1) comprising a binary coding produced by means of coding units (7) of the same surface, relatively moving with respect to an element provided with a device for reading said coding (7), said coding (7) delimiting differentiated sectors each comprising an identical separating zone, called separator, and an zone identifying a single sector, called identifier, the list of the identifier codes being contained in a memory zone accessible via a device for processing binary data transmitted sequentially bit by bit by said reading device when the elements are relatively moving. The invention is characterised in that the separator coding comprises a binary sequence which is excluded from the identifier coding, thereby immediately identifying a separator, whose knowledge of the whole code indicates the identifier following it, then the position of its corresponding sector by scanning the memory zone containing the list of identifier codes.

5 Claims, 6 Drawing Sheets

FIG. 5

Table of Codes Permitted and Excluded

DEVICE AND METHOD FOR DIGITAL POSITION MEASURING

The present invention relates to a process and a device for digital measurement of the position of one of two elements in relative motion. It preferably applies to the measurement of absolute angular position round one revolution of elements in rotation one relative to the other.

The problem of the measurement of angles of rotation, permitting knowledge at any moment of the absolute angular displacement of one piece in rotation relative to another, has generated an abundance of literature proposing a large number of solutions. These solutions have often themselves been sub-divided into multiple alternatives.

Basically, known solutions employ on the one hand encoding of positions and on the other a means for reading the codes, expressing and transmitting the instantaneous angular position of a piece in motion relative to a determined origin. This reading means, generally consisting of sensors, sends signals to a central electronic unit capable of calculating or reading the angular displacement effected and sometimes of using the calculated values to perform more extensive processing.

Such a process may for example be applied to a disc including the said codes, rotated relative to the measurement means for reading the angular position at the instant t.

Among the solutions proposed in the prior art, it is possible to distinguish several families of solutions, classified according to the encoding method employed, or according to the reading method.

Thus traditionally the methods based on parallel encoding are distinguished from those based on sequential encoding of the serial type. The reading methods are differentiated depending on whether they are direct or indirect.

Substantially, encoding is said to be parallel when the whole of the code expressing a position may be read in a single operation, at one clock signal. On the other hand, sequential encoding involves serial reading of the said code, which obviously requires a plurality of clock cycles, or a plurality of successive readings.

Encoding is direct when the angle value is read immediately, without the need to perform other calculations. On the other hand, encoding is said to be indirect when the measurement indicates a calculation base to which must be added or from which must be subtracted a value to obtain the precise angle to be measured. In accordance with one possibility, the above-mentioned disc is divided into encoded sectors, constituting the base value to which must be added or from which must be subtracted a number of steps travelled.

In this configuration with an encoded disc, direct parallel encoding may lead to a radial encoding structure, each code arranged radially on the disc corresponding to an immediately readable angular position. For the measurement resolution to be correct, the encoding must for example be effected over eight bits, which involves a resolution slightly lower than 1.5°.

Peripheral direct parallel encoding is also possible, if the positions are encoded around the whole periphery of the disc. The spacing of the elements of the code around the said periphery then corresponds to that of the sensors.

In both cases, the number of sensors employed by the measurement device is high (eight or nine), which makes this a relatively expensive solution and also increases the number of connection conductors. These solutions are applied when it is required to know the precise angular position right from the start-up of the system, which direct reading permits.

On the other hand, indirect solutions present a so-called shadow zone at start-up: in effect it is necessary at least to have changed sector to communicate an exact position. The choice of solution therefore depends on the specification and, in particular, on the possibility or otherwise of creating a shadow zone at start-up. Indirect encoding may be parallel, and in this case employs a smaller number of sensors than before, for the sectors into which the disc is divided are obviously more limited in number than the discrete angular positions: encoding over five bits, consequently requiring five sensors, would for example theoretically allow division of the disc into thirty-two sectors.

Indirect and sequential angular measurement solutions have also been proposed by serial encoding of the sectors. For example, document EP-A-0 575 663 proposes encoding employing three sensors and tracks on a rotating disc. Two of the tracks carry equidistant marks, and these two tracks are offset by a quarter of a period in order to provide two signals in quadrature when they are read by two sensors. This very classical solution permits determination of the direction of rotation and the displacement in number of steps. The document in question employs a third sensor reading a third track. This track bears marks grouped in sixes, which, read serially, give a binary number which is the absolute number of the corresponding sector. These groups of six marks are separated by groups of four marks, which are always the same, so that the organ receiving the read signal of this track can establish passage from one sector to the next or to the previous one. This group of 4 marks, known as a separator, is represented in this case by the 4 bit word "0110". The two first-mentioned signals are directed to a NOR gate which gives a direction signal (Up/Down) and a clock signal which serves to synchronise the reading of the third track and to interpret it.

The same principal is revealed in the American patent U.S. Pat. No. 4,736,187; here again two sensors read the marks and provide two signals in quadrature, which, by means of a NOR, synchronise the reading of the 3rd track. This third track gives the absolute angular position of the organ in motion by means of codes equidistributed around its circumference. Here, the different codes are distant from each other, and it is their physical distance which allows the interpretation system to differentiate them from each other. This physical distance is measured by counting the two signals in quadrature. In fact, it may be considered that the distance between two codes, void of any mark, is read by the corresponding sensor as a sequence of "1" (or of "0", depending on the arbitrary convention selected), which sequence never appears among all of the codes of the sectors. This sequence is therefore a separator made of n "1" (or "0") bits.

The present invention also uses indirect and sequential encoding. However the method of encoding the sectors is such that it permits more rapid detection of the separators and provides good protection against false readings of the codes.

One of the possible applications of the invention, the measurement of the angle of rotation of a vehicle steering column, permits the existence of a zone of uncertainty at start-up. It also imposes a resolution such that this solution appears particularly appropriate, as will be seen in detail below.

Firstly, the invention relates to a process for digital measurement of the absolute position of an element including binary encoding created by means of encoding units of the same area, in motion relative to an element provided with an organ for reading the said coding, the said coding defining differentiated sectors each including an identical separation zone, called a separator, and a zone identifying a single sector, called an identifier, the list of codes of the identifiers being contained in a memory zone accessible via an organ for processing binary data transmitted sequentially bit by bit by the said reading organ when the elements are in relative motion.

This process is essentially characterised by the fact that the separator coding comprises a binary sequence which is excluded from the coding of the identifiers, consequently immediately identifying a separator, knowledge of the whole of the code of which permits deduction of the identifier which follows it and then the position of the sector which corresponds to it by scanning the memory zone containing the list of identifier codes.

Then knowledge of the absolute position of the sector of the element having the binary coding is deduced from the memory address of the code of its identifier.

However, knowledge of the precise position of the sector is not sufficient, each sector in effect having a width being the sum of those of the encoding units of the separator and of the identifier. Unique determination of the sector would result in a more than mediocre position reading resolution.

Consequently, the absolute position of one element relative to the other also results from counting the number of bits transmitted on sequential reading from the start of the known code of the separator, identifying the start of a sector.

The bits result in effect from the reading effected on passage of encoding units all having the same area, from which it is simple to deduce the value to be added to the calculation base obtained by knowing the sector.

In accordance with one possibility, the separator coding sequence excluded from identifier codes comprises three bits having the same value.

To complete the separator codes, for example a bit has been added of opposite value to those forming the said excluded sequence, consequently creating five bit encoding of the said separators.

In this case each separator includes the bit sequence "01110" or "10001".

Preferably, in accordance with the invention, the identifiers are also encoded over five bits, theoretically permitting encoding of thirty-two sectors. With the process of the invention, excluding sequences with three identical bits, this value is converted to twenty-four sectors, as will be seen in detail below.

For the applications cited, the elements carrying the coding and the reading organ respectively are relatively rotated, the angular position of the one relative to the other being obtained absolutely around one revolution.

The selections made above are particularly suitable for these applications.

More precisely, for measuring the angle of a steering column, motor vehicle manufacturers require a resolution of 1.5°, and a zone of uncertainty at start-up not exceeding 15°.

Now, within the framework of the invention, the sectors to be read sequentially are 24 in number distributed round the whole periphery of one of the elements in relative rotation, each sector in turn being divided into ten equal steps, each corresponding to a coding bit read at each change of state of a clock signal.

Each sector therefore includes ten steps encodable as a 1 or a 0. Of these ten bits, only five consecutive bits are assigned to encoding the sector proper, and form the sector identifier. The other five bits are reserved for separation between sectors. In fact, precise identification of a sector requires the fact of being located in a sector to be known with precision. This necessitates separation zones, without which sequential reading of the codes would be meaningless, in the absence of divisions of the encoded area.

In accordance with one of the two cited possibilities, in the five steps reserved for encoding the sector separator, the two end bits have a low value, the three identical middle bits having a high value, i.e. the separator appears as "1110".

To avoid any confusion, the five steps reserved for sector identification are encoded over five bits avoiding the code identical to the separator code. However, this exclusion is insufficient to avoid all confusion. In fact, during the rotation of the rotating element, the sensor reads separator-identifier-separator sequences, and among these sequences are series of bits identical to the separator. After exclusion of these sequences, there remain twenty-seven sector encoding possibilities, corresponding to sector angles of 13.33°. In fact, as only twenty-four sectors of 15 degrees are required, it is possible to exclude three more sequences. These sequences are not selected randomly. Codes are excluded which contain four and five successive "1". With this system, as the codes with three consecutive "1" have already been excluded, there is no longer any sequence of more than two consecutive "1" in the identifier codes used. On a reading, any sequence of three "1" bits will unambiguously indicate being in the presence of a separator, and the calculation permitting identification of the current sector will be able to commence immediately. This characteristic is particularly advantageous in the case of processing signals with a microcontroller. In fact the capability to start processing immediately on the detection of three consecutive "1", whatever the direction of rotation, permits a saving of time, and therefore either permits working at higher rotation speeds or the use of a more slowly functioning microcontroller, with the attendant advantages in terms of cost, noise due to electromagnetic radiation and complexity.

The invention also relates to a device, permitting in particular the implementation of the process described above.

This device therefore permits digital measurement of the position of an element provided with marks forming binary encoding relative to an element provided with sensors permitting reading of the said encoding marks, which are arranged on two parallel tracks, one of which is selected to produce clock signals to time the reading of the marks forming the position code of the other, at least two sensors facing this track permitting the production of two all or nothing signals in quadrature by relative passage by of marks of identical area alternating their code, the NOR combination of which provides a clock signal for reading by at least one sensor of the marks of identical area on the other track, the coding of which provides the position of one element relative to the other.

It is principally characterised by the fact that the geometry and arrangement of the marks on the two tracks is such that the passage from one mark to the next is two times more frequent for the sensor of the position encoding track than for the sensors of the clock track, the said tracks being moreover so arranged that the said passage is also offset, the passage from one mark to the other on the clock track occurring when the sensor reading the codes of the encoding track is in the middle of a mark.

In the preferred application, the elements provided with the sensors and the encoding tracks have relative rotational motion, the encoded element being a disc comprising two concentric encoding tracks, the marks forming the coding being angular sectors defined by two concentric circles bordering each track.

The device provides to an external reception organ the signals which will allow it, by means of suitable processing, to determine the absolute angle around one rotation of the rotating organ.

The device in accordance with the invention only requires three sensors to read an angular position with a resolution sufficient for the intended applications, in this case equal to 1.5°. This resolution of 1.5° is obtainable in practice with means and components of reasonable cost, as the field of application of the product requires.

Two of the sensors generate signals in phase quadrature during the relative angular displacement of the two elements, analysis of which permits deduction of the direction of relative rotation and the NOR combination of which generates a signal, each ascending or descending front of which marks the start of an equal rotation step, thus constituting a clock signal which is solely a function of angular displacement. It is the processing organ receiving the signals which, with its internal circuitry, generates the NOR.

The third sensor retransmits the serially encoded data relating to the sector opposite which it is situated, at the rate of one coding bit per change of state of the clock signal.

In practice, the first two sensors form an actual clock timing the reading effected by the third sensor.

The three sensors together therefore co-operate with two distinct encoding tracks having identical rotational motion relative to the sensors, a track selected for the sensors generating the signals in quadrature necessary for the creation of the clock signal, and a track comprising the serial codes necessary to identify the sectors, the said sensors sending the read data continuously.

As has been seen, on this latter track, each sector defined on one of the two elements in relative motion includes a coding zone permitting identification proper of the sector and a coding zone of a sector separator, the said zones being read sequentially by the third sensor.

The problem was mentioned above of multiple connections due to the plurality of sensors: in accordance with one possibility the three signals emitted by the sensors are multiplexed into a single signal, for example encoded at eight voltage levels, which only requires one connection to the processing organ. A simpler alternative of course will consist of leaving the said three connections in parallel, sent directly from the sensor to the said processing organ.

Using the above elements, the device in accordance with the invention gives the measurement of the angular position, which results from identification of the sector in which the position to be measured is situated, transmitted by the lone sensor, while displacement between the said position and the start of the said sector, calculated in numbers of steps, is transmitted by the two other sensors in NOR combination.

In accordance with one possibility, the encoding marks are holes, equidistributed around the clock track with a hole area equal to the area between two consecutive holes.

Alternatively, the encoding marks consist of marks of different colours, equidistributed and of equivalent area for each colour on the clock track.

Preferably, reading of the encoded data on one of the elements in relative rotation is effected by optical sensors.

More preferably, the said sensors operate by reflectance optics.

However, nothing prevents operation by means of traversing optical sensors, or even magnetic sensors, the sectors then being covered with a layer of magnetic material depending on code assigned to each sector and co-operating with suitable detectors.

In accordance with one possibility, the encoding disc is made of polished metal and co-operates with light emitting and receiving sensors, by reflectance.

In accordance with an alternative configuration, the encoding disc is made of plastics material metallised on the surface, and co-operates with light emitting and receiving sensors, by reflectance.

The existence has been mentioned above of an encoded disc co-operating with fixed sensors. The invention could, however, be applied very simply to sensors rotating with a rotary element, co-operating with fixed encoded tracks firmly attached to an immobile piece.

The invention is also applicable to position measurement of two elements moving in translation relative to each other.

It is however clear that one of the preferred applications of the measuring device of the invention will be measuring the angle of displacement of a steering wheel of a motor vehicle, the specification of this application corresponding particularly well to the precise values given above.

The invention will now be described in detail, with reference to the attached drawings, in which.

Figure 6:
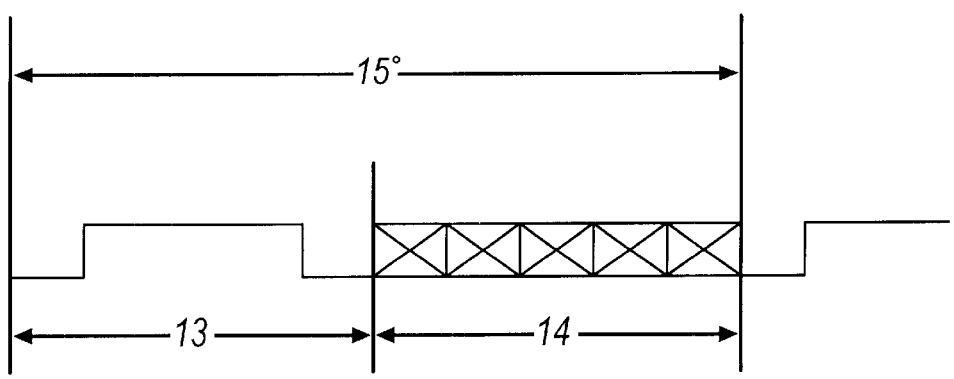
Figure 4:
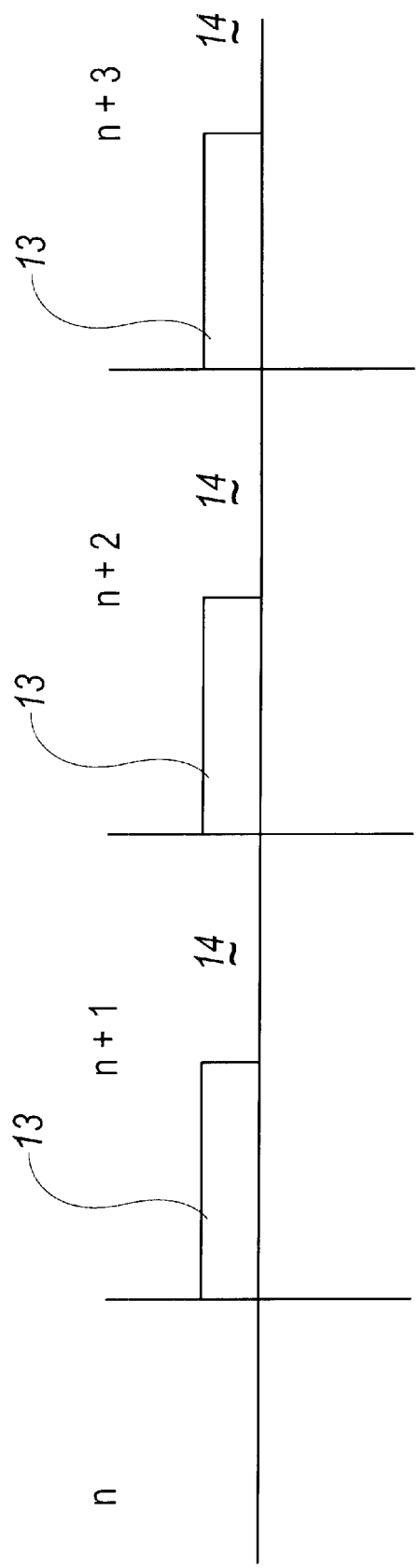
Figure 7:
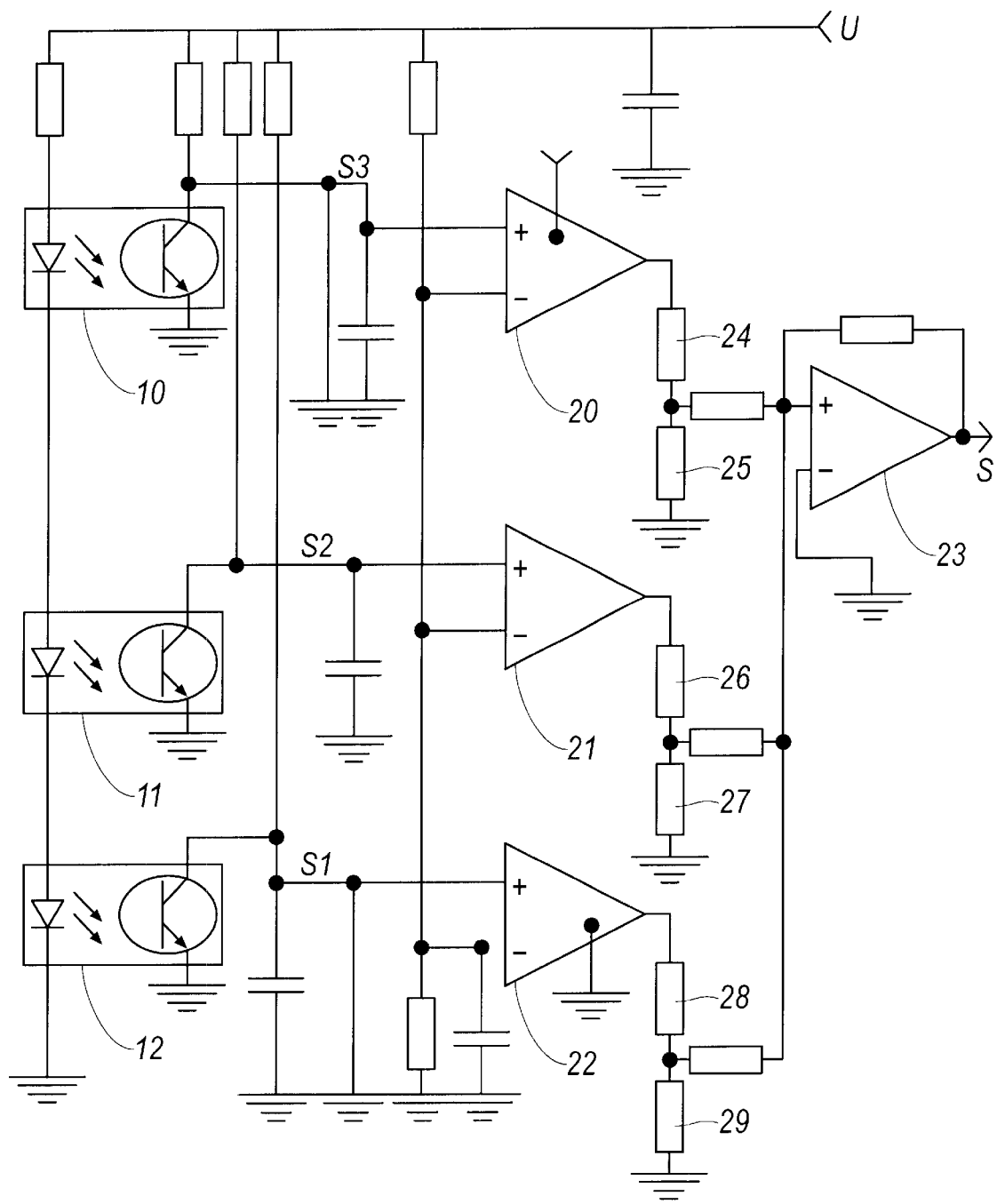

FIG. 4 gives the principal of sector encoding;

Figure 5:
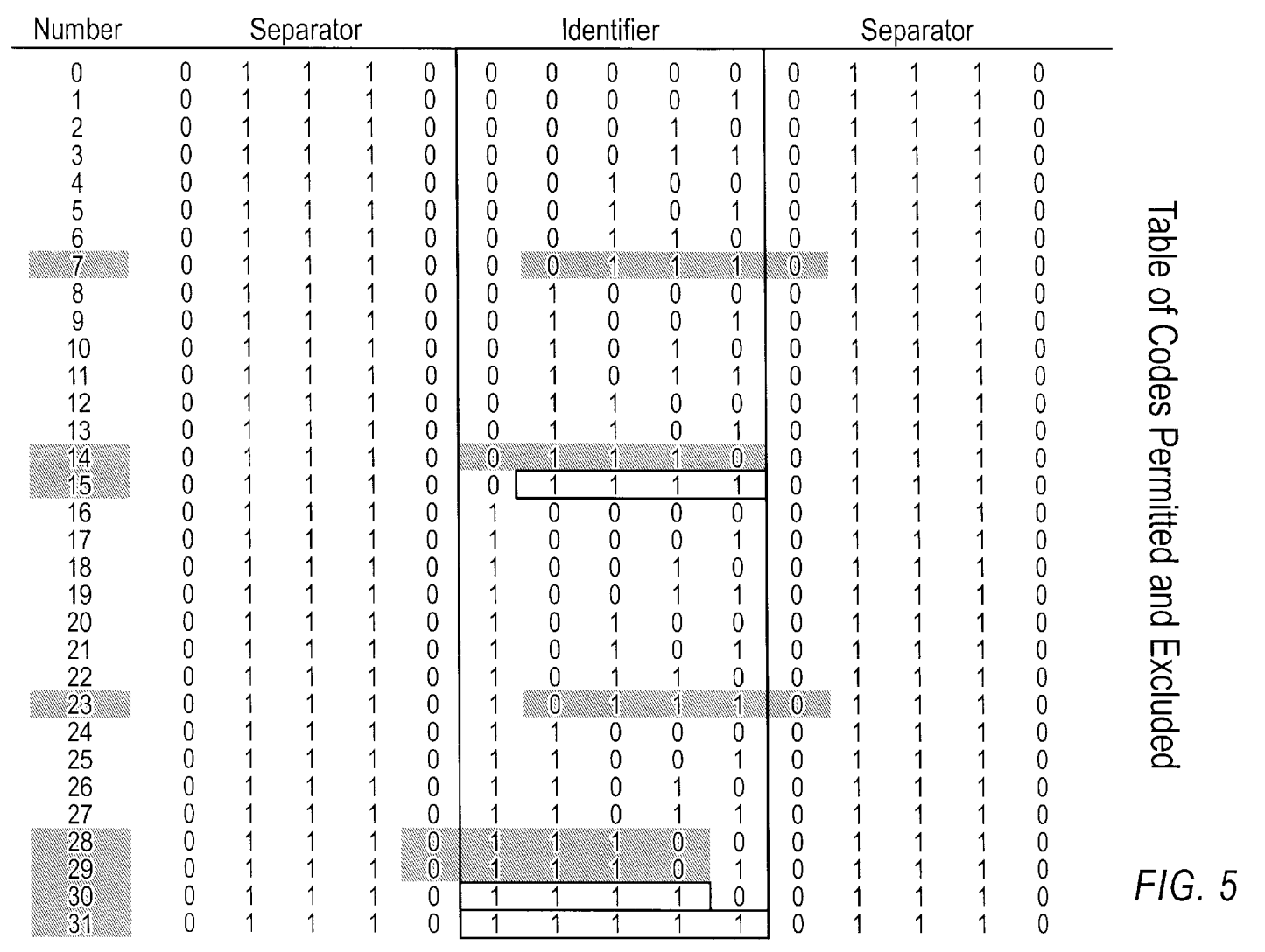

FIG. 5 shows a table of the permitted and excluded codes for the sector encoding;

FIG. 6 shows one possibility of application of this principle within the framework of the invention; and FIG. 7 shows a diagram of an electronic circuit positioned downstream of the sensors, permitting encoding by voltage level.

The above-mentioned figures show diagrammatically a few elements of the invention, and cannot therefore be considered as limiting the invention.

Figure 1:
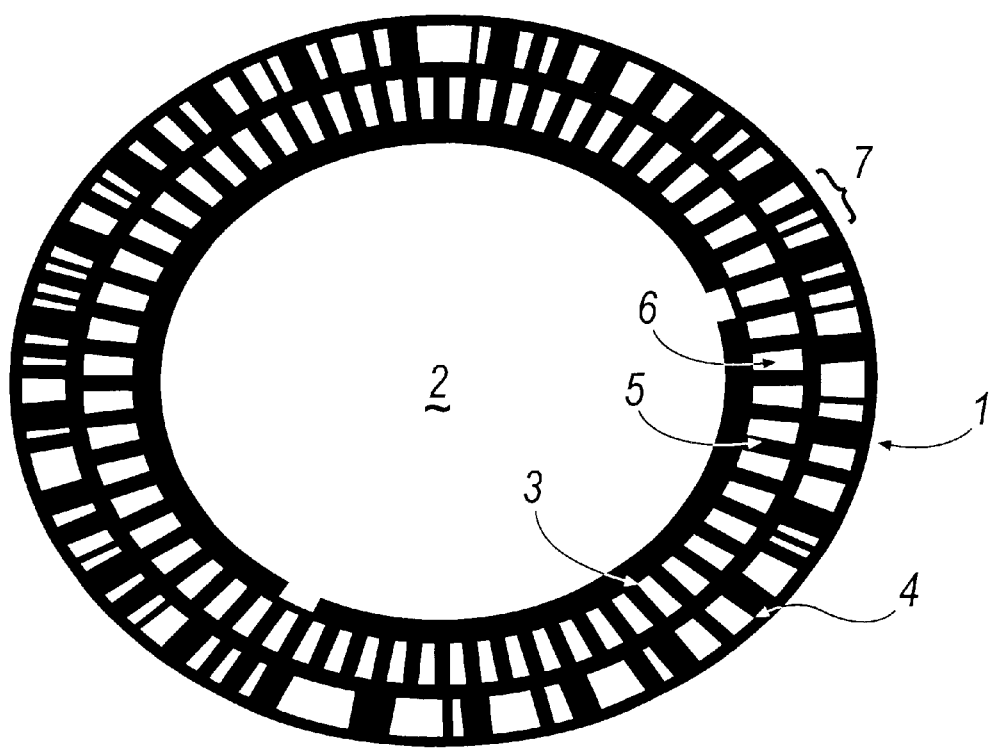
FIG. 1 shows a rotary encoded disc.

The encoded disc 1 of FIG. 1 includes a central orifice 2 intended to connect it mechanically to a rotating shaft (not shown). This disc 1 comprises two concentric peripheral encoding tracks 3, 4, intended for two distinct functions.

The inner track 3 includes encoding units or marks 5, 6 of the same angular spacing, encoded alternatively with two values 0 and 1. Preferably, the said encoding units are in the form of holes or windows in the support, the windows indicating a "1" and the unperforated parts indicating a "0". Although this convention might appear arbitrary, it arises from the fact that when the light source of a sensor illuminates the encoding disc and is situated facing a hole, then the light reflected by the disc is very weak. As a result the phototransistor of the sensor does not receive light. It is obstructed and its collector is at the high level, i.e. at "1".

The outer track 4 includes encoding units or marks 7 the unitary angular spacing of which is two times more narrow, and also encoded with two values 0 and 1, in accordance with coding which depends on its particular function and which will be seen in detail below. The track 4 is constructed in the same manner as track 3, with holes forming the coding.

Figure 2:
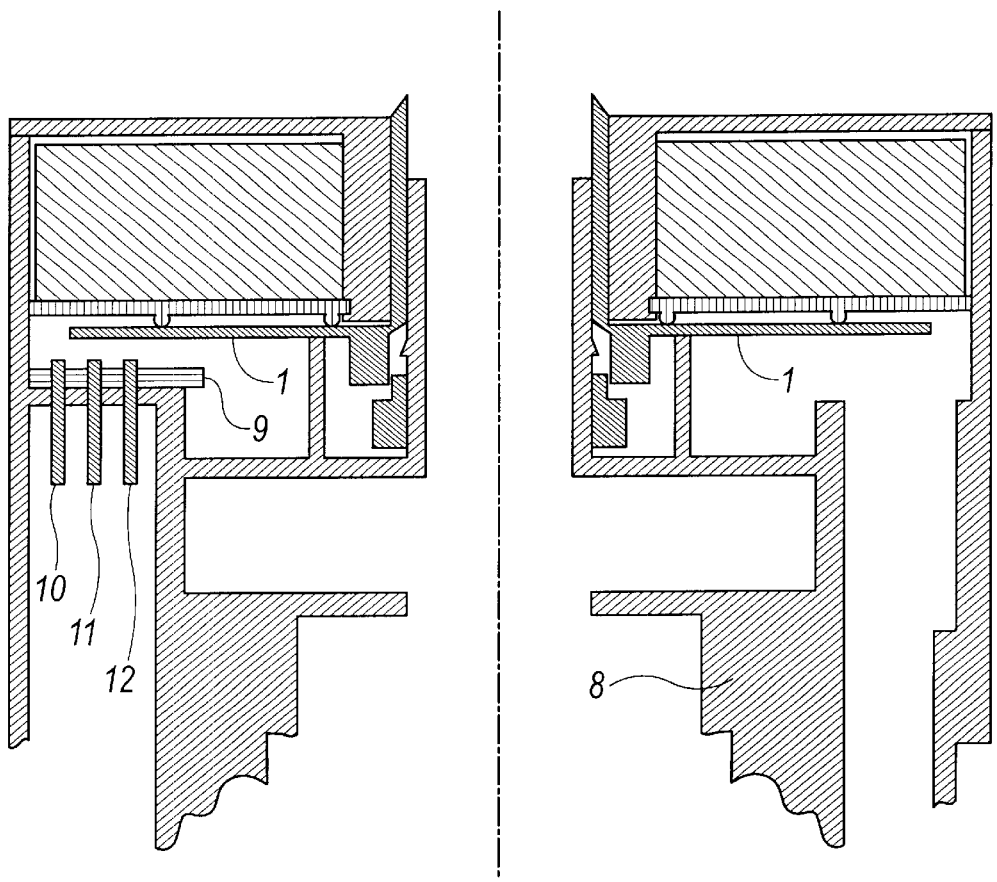
FIG. 2 shows the position of such a disc relative to the sensors fixed to a combinative support.

FIG. 2 shows a very diagrammatic section of the relative arrangement of such an encoded disc 1 in a combinative support 8 positioned, in the vehicle, around the steering column (not shown) directly under the steering wheel.

The advantage of this FIG. 2 is to show the angle sensors 10, 11, 12 fixed to the said combinative support 8 and connected to a printed circuit 9 itself arranged facing the encoded disc 1.

The sensor 10, positioned facing the track 4 of FIG. 1, reads the codes identifying the sectors, between the codes of the sector separators. These codes consist of encoding units 7 to which a 1 or 0 coding is assigned.

The sensors 11 and 12 are facing track 3, so that when one of the said sensors is on the edge of one of the said zones, the other sensor is in the middle of a similarly coded unit. The signals generated, S1 and S2, are in phase quadrature and suited to the above-mentioned measurement process. The technology used to assign them alternate encoding is of course the same as previously.

Diagrammatically, to facilitate understanding, the output connection tabs of the three sensors are, in FIG. 2, identified with the said sensors 10, 11, 12. It is quite obvious that the two sensors 11 and 12 are however on the same track, and not on two distinct radii.

Figure 3:
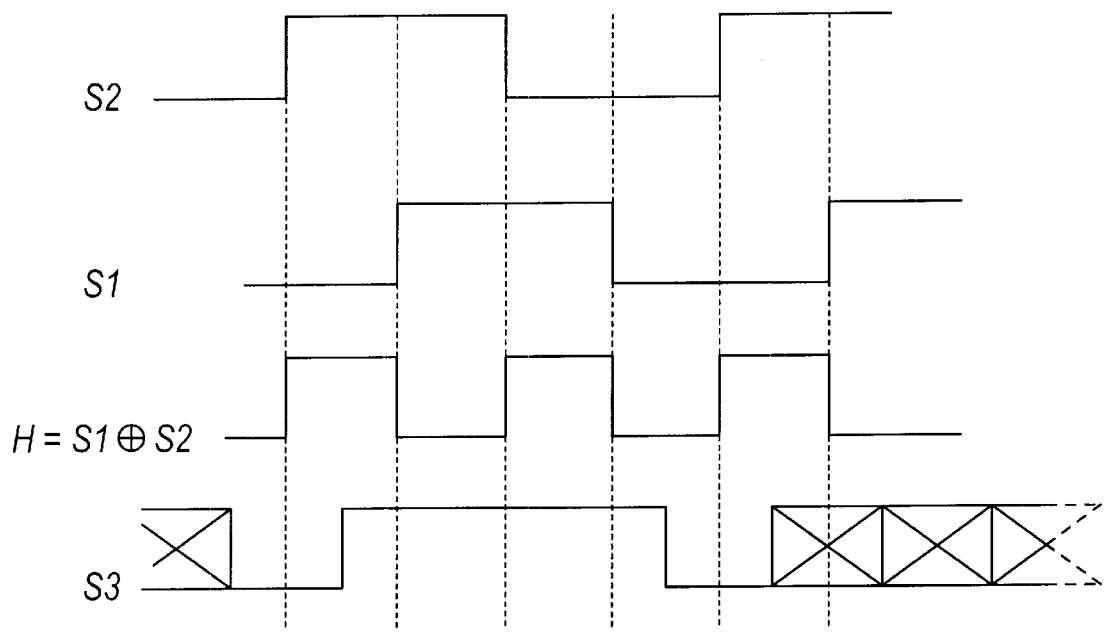
FIG. 3 is a diagram of the signals emitted by the sensors, and the clock signal.

The diagram of FIG. 3 shows the signals S1 and S2 generated by the sensors 11 and 12, and the signal obtained by the logical NOR combination of the processing organ, giving a clock signal H solely dependent on the angle travelled, and not on time. The signal S3 also appears in this FIG. 3. In particular, the five bits of the separator and the end and the start of two contiguous identifiers may be distinguished.

It is this signal H which times the reading effected by the sensor 10 generating a signal S3, and more generally which serves as clock for the subsequent processing operations resulting in the angle measurement. It is important to stress that the sensor 10 and the track 4 are so arranged relative to the track 3 that the transitions of the signal H always fall in the middle of the states of the signal S3. In this manner, the reading of S3, synchronised on the transitions of H, and therefore of S1 and S2, is always effected when its state is stable, which greatly reduces risks and false readings possible in a noisy environment.

The explanation of the method for encoding the sectors appears in FIGS. 4 and 6. FIG. 4 shows diagrammatically four successive sectors n to n+3, in practice defined on the encoded disc by means of the said coding. FIG. 6 shows the coding: each sector includes two zones, a separator 13 and a coding zone 14 proper. The separator 13 always has the same value, and the coding zone 14 is encoded over five bits and permits identification of the sector relative to the origin. The separator 13 permits recognition that there is a sector change and the identification process can be initiated.

In accordance with a preferred application of the invention, the separator is also encoded over five bits, with the two end bits at 0 and the three middle bits at 1.

To avoid any confusion between the zone assigned to the separator 13 and that assigned to the sector identification 14, the codes used for the said identification comprise no code equal to the separator, nor any code which combined with the preceding separator and the subsequent separator, is equal to the separator, nor lastly, as explained above, any code which contains three or four consecutive "1", i.e. the sequence of three consecutive "1" having to be excluded.

It is this which appears in the table of FIG. 5. This table shows the thirty-two possible separator-identifier-separator sequences. The shaded lines show a code equal to the separator. The codes of these lines are excluded form the usable codes. The boxed sequences are those excluded voluntarily, as containing the excluded sequence, to obtain a total of twenty-four possible codes.

The preferred example described thus far then includes twenty-four sectors encoded over five bits. Of course, this example is not limiting to the invention, and there may without difficulty be a greater number of sectors, encoded over more than five bits, the limits being more of the technical order, namely in particular the resolution limitations permitted by the reading means.

FIG. 7 shows an example of an electronic circuit diagram which could be used at the output of the sensors to encode by voltage level the signals S1, S2, S3 emitted by the sensors 10 to 12. Each of these signals is passed to an amplifier 20, 21, 22 set up as a voltage comparator so that the voltage levels presented at the input of the output amplifier 23 are perfectly shaped. The signals from the three comparators are subject to a weighted sum by the pairs of resistances 24/25, 26/27 and 28/29, so that they supply a single analogue output signal at eight levels reflecting their value. The capacitors which connect the signals S1, S2 and S3 to ground are of low value. They filter the signals and contribute to the elimination of possible noise.

This encoding means permits a single connection S to be obtained at the output of the circuit.

What is claimed is:

1. Process for indirect and sequential digital measurement of the absolute position of an element including binary cobding affected by means of encoding units having the same area, in motion relative to an element provided with an organ for reading the coding, the said coding defining differentiated sectors each including an identical separation zone called a separator, and a zone identifying a single sector called an identifier, the code list of the identifiers being contained in a memory zone accessible by way of an organ for processing binary data sequentially transmitted bit by bit by the reading organ when the elements are in relative motion, the encoding of the separator including a binary sequence which is excluded from the encoding of the identifiers, consequently immediately identifying a separator, and permitting deduction of the identifier which follows it, wherein the position of the sector which corresponds to the identifier arranged after the identified separator is obtained by scanning the memory zone containing the list of the identifier codes, knowledge of the absolute position of the sector of the element provided with the binary coding being deduced from the memory address of the code of the identifier, wherein the coding sequence of the separator excluded from the codes of the identifiers includes three bits having the same value, wherein the codes of the separators include three bits of the same value surrounded by one bit of opposite value at each end of the sequence.

2. Process for indirect and sequential digital measurement as claimed in claim 1, wherein the absolute position of one element relative to the other element results from counting the number of bits transmitted upon sequential reading from the start of the known code of the separator, identifying the start of a sector.

3. Process for indirect and sequential digital measurement as claimed in claim 1, wherein the central bits are at the high level.

4. Process for indirect and sequential digital measurement as claimed in claim 1, wherein the identifiers are encodes over five bits, permitting the encoding of 24 sectors.

5. Process for indirect and sequential digital measurement as claimed in claim 1, wherein the elements bearing the coding and the reading organ respectively are relatively rotated, the angular, position of one relative to the other being obtained absolutely around one revolution.

* * * * *